(12) United States Patent
De Bruin et al.

(10) Patent No.: US 9,610,947 B2
(45) Date of Patent: Apr. 4, 2017

(54) METHOD FOR LANE-KEEPING SUPPORT FOR AUTOMOBILES

(71) Applicant: Bayerische Motoren Werke Aktiengesellschaft, Munich (DE)

(72) Inventors: Dirk De Bruin, Allershausen (NL); Martin Rau, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/592,478

(22) Filed: Jan. 8, 2015

(65) Prior Publication Data
US 2015/0120144 A1 Apr. 30, 2015

Related U.S. Application Data

(63) Continuation of application No. PCT/EP2013/064078, filed on Jul. 3, 2013.

(30) Foreign Application Priority Data

Jul. 9, 2012 (DE) .................. 10 2012 211 901

(51) Int. Cl.
*B60W 30/12* (2006.01)
*B60T 8/17* (2006.01)
(Continued)

(52) U.S. Cl.
CPC ......... *B60W 30/12* (2013.01); *B60T 8/17557* (2013.01); *B60W 10/04* (2013.01);
(Continued)

(58) Field of Classification Search
CPC ........... B60T 8/17557; B60T 2270/402; B62D 15/026; B60W 30/12; B60W 30/16;
(Continued)

(56) References Cited

U.S. PATENT DOCUMENTS 6,279,674 B1 8/2001 Lissel et al.
7,630,800 B2 12/2009 Hirano et al.
(Continued)

FOREIGN PATENT DOCUMENTS

CN 1906061 A 1/2007
DE 196 32 251 A1 2/1998
(Continued)

OTHER PUBLICATIONS

International Search Report dated Sep. 20, 2013 (Two (2) pages).
(Continued)

*Primary Examiner* — Rodney Butler
(74) *Attorney, Agent, or Firm* — Crowell & Moring LLP

(57) ABSTRACT

The invention relates to a method for providing lane-keeping support in automobiles during the operation of a fully automatic driver assistance system designed for driver-independent vehicle guidance by means of a control unit which controls the actuatorics of a steering system during operation of this driver assistance system such that the vehicle is maintained within the driving lane, characterized in that, in the event of failure of the steering system, targeted braking interventions are performed in order to maintain the lateral guidance for the lane-keeping support of the vehicle by means of a braking system of the vehicle.

12 Claims, 1 Drawing Sheet

(51) Int. Cl.
    *B62D 15/02*       (2006.01)
    *B60W 10/04*      (2006.01)
    *B60W 10/18*      (2012.01)
    *B60W 10/20*      (2006.01)
    *B60W 30/16*      (2012.01)
    *B60T 8/1755*     (2006.01)
    *B60W 50/029*    (2012.01)

(52) U.S. Cl.
    CPC ............ *B60W 10/18* (2013.01); *B60W 10/20* (2013.01); *B60W 30/16* (2013.01); *B62D 15/026* (2013.01); *B60T 2270/402* (2013.01); *B60W 50/029* (2013.01)

(58) Field of Classification Search
    CPC ...... B60W 10/04; B60W 10/18; B60W 10/20; B60W 50/029
    See application file for complete search history.

(56) References Cited

U.S. PATENT DOCUMENTS

| | | | |
|---|---|---|---|
| 7,673,950 B2 * | 3/2010 | Fulks et al. | 303/193 |
| 2004/0090117 A1 * | 5/2004 | Dudeck | B60T 7/22 303/191 |
| 2005/0137772 A1 * | 6/2005 | Smakman et al. | 701/70 |
| 2008/0186154 A1 * | 8/2008 | Haug | 340/435 |
| 2010/0036562 A1 * | 2/2010 | Becker | 701/41 |
| 2010/0131233 A1 * | 5/2010 | Deng et al. | 702/151 |
| 2010/0148948 A1 * | 6/2010 | Murphy | B60W 30/12 340/435 |
| 2010/0318256 A1 * | 12/2010 | Breuer et al. | 701/29 |
| 2011/0040454 A1 * | 2/2011 | Bonne | B60T 7/12 701/48 |
| 2012/0283907 A1 * | 11/2012 | Lee et al. | 701/31.9 |
| 2013/0253793 A1 * | 9/2013 | Lee | B60W 50/029 701/70 |
| 2013/0304326 A1 * | 11/2013 | Van Dongen | B60W 30/12 701/42 |
| 2014/0222277 A1 * | 8/2014 | Tsimhoni | B60W 30/00 701/23 |

FOREIGN PATENT DOCUMENTS

| | | |
|---|---|---|
| DE | 199 52 227 A1 | 9/2000 |
| DE | 103 57 922 A1 | 7/2004 |
| DE | 10 2009 050 399 A1 | 5/2011 |
| DE | 10 2010 001 068 A1 | 7/2011 |
| DE | 10 2010 021 591 A1 | 12/2011 |

OTHER PUBLICATIONS

German Search Report dated Feb. 12, 2013, with Statement of Relevancy (Seven (7) pages).

Chinese Office Action issued in Chinese counterpart application No. 201380036377.6 dated May 5, 2016, with partial English translation (Twelve (12) pages).

* cited by examiner

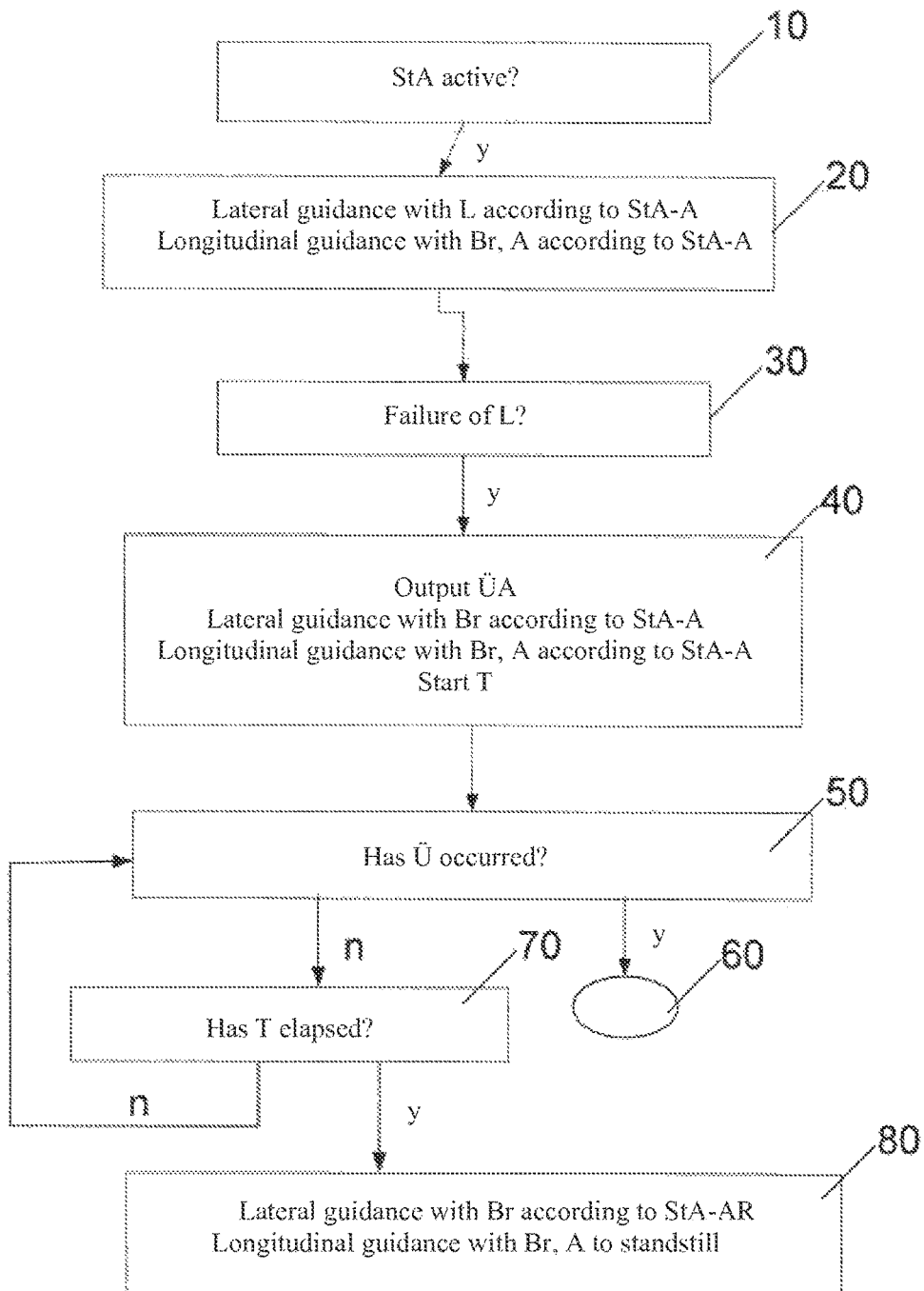

METHOD FOR LANE-KEEPING SUPPORT FOR AUTOMOBILES

CROSS REFERENCE TO RELATED APPLICATIONS

This application is a continuation of PCT International Application No. PCT/EP2013/064078, filed Jul. 3, 2013, which claims priority under 35 U.S.C. §119 from German Patent Application No. DE 10 2012 211 901.9, filed Jul. 9, 2012, the entire disclosures of which are herein expressly incorporated by reference.

BACKGROUND AND SUMMARY OF THE INVENTION

The invention relates to a method for providing lane-keeping support in automobiles during the operation of a fully automatic driver assistance system according to the preamble of claim 1 designed for driver-independent vehicle guidance.

Fully automatic driver assistance systems designed for driver-independent vehicle guidance are currently being developed by many automobile manufacturers whose aim it is to unburden the driver from the driving task in certain traffic situations by fully automatically taking over the driving task. One noteworthy example is a so-called congestion assistance, which can be used in congested situations on freeways. In that case, at a predetermined threshold speed of 60 km/h, for example, both the longitudinal guidance (analogous to a distance-dependent speed control) and the lateral guidance for maintaining the vehicle within the traffic lane are performed automatically. In a special embodiment of such congestion assistants, the driver is even supposed to be permitted to remove their hands from the steering wheel at least for a certain time.

Such fully automatic driver assistance systems designed for driver-independent vehicle guidance require high levels of safety requirements, since there might be great risks both to the driver and to other participants in the traffic in the event of an error.

A method for operating such a driver assistance system is already known from DE 10 2010 021 591 A1 in which it is continuously monitored by means of a plausibility monitoring module whether a fault is present. Various situations are defined as faults, such as the vehicle traveling too fast or backwards, undershooting of a certain minimum distance to a vehicle traveling ahead, and/or the vehicle leaving the lane. If such a fault is detected, at least one driving intervention serving to bring the vehicle to a safe state is carried out. One drawback of such a system is that a fault is only detected and a counteracting intervention is only carried out once a faulty or critical state of the vehicle has already been detected.

Besides such faults, due to legal regulations it is necessary in such driver assistance systems to check the actuatorics for a fault in order to comply with a certain safety objective. For instance, the vehicle must be kept in the driving lane nonetheless even if the actuatorics controlling the lateral guidance fails. Various considerations to this end are already known.

For instance, DE 199 52 227 B4 already discloses an automobile steering system which provides a second servo drive for the automobile steering which can be used in the event of failure of the first servo drive as an emergency system. Not only is such a system associated with high costs, it also adds more weight to the vehicle.

Finally, DE 10 2010 001 068 A1 discloses a method for lane-keeping support for an automobile which comprises a torque vectoring system in which the lane-keeping support is performed through targeted asymmetrical torque distribution by means of the torque vectoring system. This, in turn, is only possible in vehicles which are equipped with such a torque vectoring system.

It is the object of the invention to provide an improved and cost-effective method for lane-keeping support for automobiles which enables the vehicle to be kept within the driving lane even in the event of failure of the steering actuatorics.

This object is achieved by a method according to claim 1. Advantageous developments follow from the dependent claims.

In principle, the invention emanates from a method for lane-keeping support for automobiles during operation of a fully automatic driver assistance system designed for driver-independent vehicle guidance. Such driver assistance systems are embodied such that, in the presence of predetermined basic conditions—at a speed that lies below the predetermined threshold speed, for example—the actuatorics of an (electrically operated) steering system and/or the actuatorics of a drive system and/or braking system are controlled by means of one or more control devices such that the vehicle is guided and maintained within the selected driving lane and with consideration of a vehicle traveling ahead and any other traffic participants. The longitudinal guidance can be performed in a manner analogous to the longitudinal guidance of a distance-dependent speed control (adaptive cruise control, ACC).

The fundamental idea of the invention is to make it possible, even in the event of failure of the steering system or the steering actuatorics, to continue to ensure that the vehicle is kept in the driving lane nonetheless, at least for a certain time. To ensure that this requirement is met, the method according to the invention is characterized in that, in the event of failure of the steering system, which can particularly be embodied as an electrically actuatable steering system, targeted braking interventions, particularly wheel-selective braking interventions, are performed to maintain the lateral guidance for lane keeping support by means of a braking system of the vehicle that is present in any case; that is, the lateral guidance of the vehicle is taken over by the braking system in the event of failure of the (electrical) steering system. This is possible because indirect steering is achieved through wheel-selective braking interventions, particularly in the direction of over-steering or understeering.

Since the maintaining of the lateral guidance is taken over by the braking system immediately upon failure of the steering system, it can be ensured that the driver or other traffic participants are not subjected to an elevated safety risk even as a, result of a temporary departure from the driving lane due to defective steering on the part of the driver.

In an advantageous development of the invention, if a failure of the steering system is detected, such braking interventions can be performed that the vehicle is guided along within the driving lane on the basis of the lateral guidance requirement or lateral guidance trajectory if the steering system is working that is detected or requested by the fully automatic driver assistance system designed for driver-independent vehicle guidance. In other words, the identical lateral guidance is to be implemented independently of the actuatorics influencing the lateral guidance, and the vehicle is to be guided on the identical lateral guidance trajectory.

Alternatively, the method according to the invention can also be embodied such that, in the event of failure of the steering system, such braking interventions can be performed to maintain the lane-keeping support or the automatic lateral guidance that the vehicle is guided along a newly determined lateral guidance fallback trajectory which is determined especially for the failure situation of the steering system.

Advantageously, the lateral guidance can also be carried out in the event of failure of the steering system through a combination of the two alternatives described. For instance, immediately upon failure of the steering system, the lateral guidance can be carried out for a certain time or over a certain distance on the basis of the (originally) requested lateral guidance if the steering system is working. If the driver has then not intervened in the guidance of the vehicle, the lateral guidance is continued on the basis of a determined lateral guidance fallback trajectory.

Advantageously, the method according to the invention can also be developed such that, upon failure of the steering system, the lateral guidance is not only taken over by the braking system, but a special intervention is also made in the longitudinal guidance of the vehicle. Advantageously, such braking interventions can be made, for example, such that the vehicle, in addition to being kept within the driving lane within a predetermined first time interval or a predetermined first distance, is braked to a standstill; that is, the braking system takes over not only the lateral guidance but also ensures, through commensurate controlling of the actuatorics, that the vehicle is braked to a standstill. However, the other traffic participants, particularly a vehicle traveling ahead, must continue to be considered.

Alternatively, the longitudinal guidance can also be influenced or specifically not influenced such that, upon failure of the steering system, such braking interventions are performed if the steering system is working that the longitudinal guidance requested by the driver assistance system designed for driver-independent vehicle guidance remains nearly uninfluenced at least with respect to the deceleration request even in the event of failure of the steering system. Accordingly, the implementation with respect to an acceleration request made on the basis of the driver assistance system is also done by the corresponding actuatorics, that is, the drive unit, analogously to the fault-free case; that is, the longitudinal guidance is therefore performed identically to the original request of the driver assistance system.

In particular, this longitudinal guidance (desired on the basis of the request of the assistance system when the steering system is working) can also be carried out only for a predetermined second time interval or a predetermined second distance and/or until occurrence of a terminating condition, with a terminating condition being present, for example, if strong acceleration and/or decelerations are requested. If this is the case, in an advantageous development of the method, at the end of the second time interval and/or after the predetermined second distance and/or upon occurrence of the terminating condition, such braking interventions are performed that, in addition to the required lateral guidance for lane-keeping, the vehicle comes to a standstill or is braked to a standstill within a predetermined third time interval or a predetermined third distance.

Since a failure of the steering system can always be associated with risk to the driver despite the described fallback level, the driver should at least be informed in the event of failure of the steering system and be prompted to perform independent (lateral) guidance of the vehicle. To ensure this, a takeover prompt for takeover of the vehicle guidance is advantageously outputted to the driver either immediately upon failure of the steering system or at the end of the second time interval and/or after the predetermined second distance and/or upon occurrence of the terminating condition. If the driver does not follow this takeover prompt within a time interval, the vehicle can automatically be moved to a safe state (standstill at the edge of the road).

BRIEF DESCRIPTION OF THE DRAWINGS

The invention will be explained again in further detail on the basis of the following exemplary embodiment. The sole FIGURE shows a simplified flow diagram of an advantageous embodiment of the method according to the invention. This method can be implemented within a control device or distributed over several control devices provided for this purpose.

FIG. 1 depicts a flow diagram illustrating one possible embodiment of the method according to the invention.

DETAILED DESCRIPTION OF THE DRAWINGS

The flow diagram illustrating one possible embodiment of the method according to the invention begins with step 10 as soon as the fully automatic driver assistance system designed for driver-independent vehicle guidance and embodied as a congestion assistant StA is in operation. If this is the case, a steering actuatorics L, which can be embodied as an electrically operated steering system, is controlled (in step 20) according to the requests of the congestion assistant StA-A for lane-keeping; that is, a controlling of the lateral guidance q occurs. At the same time, the braking system Br and drive system A are controlled for the longitudinal guidance of the vehicle according to the requests of the congestion assistant StA-A. The longitudinal guidance can be performed identically to a longitudinal guidance of a distance-dependent speed control system.

Further along in step 30, a check is continuously performed as to whether a failure of the steering system L is present. If a failure of the steering system L is detected (j), in the following step 40 a takeover prompt ÜA for the takeover of the vehicle guidance is outputted to the driver in the form of an acoustic, haptic and/or optic message. In addition, analogously to above, the longitudinal control of the vehicle is carried out identically through appropriate controlling of the braking system Br and of the drive system A. Since the steering system L is now no longer available for the lateral guidance of the vehicle, the lateral guidance is now through appropriate controlling of the braking system Br on the basis of the lateral guidance request StA-A of the congestion assistant StA if the steering is working; that is, the lateral guidance request StA-A or the lateral guidance trajectory remains unchanged. Finally, in step 40, a timer T is also started for the monitoring of a time interval.

After the measures of step 40 have been initiated, a check is performed in the next step 50 whether the driver has taken over the guidance Ü of the vehicle. If this is the case (y-branch), the congestion assistant StA is deactivated in step 60 and the process is thus ended.

If the driver has not taken over the guidance of the vehicle (n-branch), a check is performed in the next step 70 whether the timer T has expired. As long as the timer T has not yet expired, that is, the time interval has not yet elapsed (n-branch), step 50 is repeated and the check of the vehicle takeover Ü and of the timer expiration T is performed analogously.

As soon as it is detected in step 70 that the timer T has expired (y-branch), the lateral guidance of the vehicle is changed such that the lateral guidance is no longer carried out on the basis of the lateral guidance request StA-A if the steering system L is working, but by the braking system Br on the basis of congestion assistant requests StA-AR detected or predetermined especially for this fault. This change in lateral guidance by the congestion assistant StA-AR in the event of a defective steering system L can be embodied, for example, such that the vehicle is guided to the right edge of the driving lane or to the right shoulder. Analogously to the changed lateral guidance, the longitudinal guidance can also be changed such that the longitudinal guidance is no longer carried out on the basis of the congestion assistant request StA-A if the steering system L is working, but by the braking system Br, and optionally the drive system, on the basis of congestion assistant requests StA-AR detected or predetermined especially for this fault. This longitudinal guidance or the congestion assistant request StA-AR for the fault relevant to the longitudinal guidance can be embodied such that the vehicle comes to a standstill within a defined distance.

By virtue of this method, it can thus be ensured in a simple and cost-effective manner that, during operation of a fully automatic driver assistance system designed for driver-independent vehicle guidance, the vehicle can be maintained within the driving lane despite a failure of the steering system by apportioning the legally prescribed availability requirement to the steering system and a braking system of the vehicle.

What is claimed is:

1. A method for lane-keeping support of automobiles during operation of a fully automatic driver assistance system configured for driver-independent vehicle guidance, the method comprising:
controlling actuatorics of a steering system of a vehicle during operation of the driver assistance system such that the vehicle is maintained within a driving lane,
checking, on a continuous basis, whether a failure of the steering system is present,
in the event of such failure of the steering system, performing targeted braking interventions in order to maintain the lateral guidance for the lane-keeping support of the vehicle using a braking system of the vehicle, and
performing such braking interventions such that longitudinal guidance requested by the driver assistance system is implemented for no more than one of a predetermined first time interval and a predetermined first distance.

2. The method according to claim 1, wherein in order to maintain the lateral guidance, the method further comprises performing such braking interventions such that the vehicle is guided along within the driving lane on the basis of the lateral guidance requirement or lateral guidance trajectory if the steering system is working that is detected or requested by the fully automatic driver assistance system designed.

3. The method according to claim 1, wherein in order to maintain the lateral guidance, the method further comprises performing such braking interventions such that the vehicle is guided along a newly determined lateral guidance fallback trajectory which is determined for a failure situation of the steering system.

4. The method according to claim 1, wherein, in the event of failure of the steering system, the method further comprises performing such braking interventions such that, in addition to being guided laterally, the vehicle is braked to a standstill within a predetermined second time interval or a predetermined second distance.

5. The method according to claim 2, wherein, in the event of failure of the steering system, the method further comprises performing such braking interventions such that, in addition to being guided laterally, the vehicle is braked to a standstill within a predetermined second time interval or a predetermined second distance.

6. The method according to claim 3, wherein, in the event of failure of the steering system, the method further comprises performing such braking interventions such that, in addition to being guided laterally, the vehicle is braked to a standstill within a predetermined second time interval or a predetermined second distance.

7. The method according to claim 1, wherein, at the end of the one of the predetermined first time interval and after the predetermined first distance, such braking interventions are performed such that, in addition to the lateral guidance, the vehicle is braked to a standstill within a predetermined second time interval or a predetermined second distance.

8. The method according to claim 1, wherein, in the event of failure of the steering system or at the end of the first predetermined time interval and/or after the predetermined first distance, the method further comprises outputting to the driver a takeover request for a takeover of the vehicle guidance.

9. The method according to claim 2, wherein, in the event of failure of the steering system or at the end of the first predetermined time interval and/or after the predetermined first distance, the method further comprises outputting to the driver a takeover request for a takeover of the vehicle guidance.

10. The method according to claim 3, wherein, in the event of failure of the steering system or at the end of the first predetermined time interval and/or after the predetermined first distance, the method further comprises outputting to the driver a takeover request for a takeover of the vehicle guidance.

11. A method for lane-keeping support of automobiles during operation of a fully automatic driver assistance system configured for driver-independent vehicle guidance, the method comprising:
controlling actuatorics of a steering system of a vehicle during operation of the driver assistance system such that the vehicle is maintained within a driving lane,
checking, on a continuous basis, whether a failure of the steering system is present,
in the event of such failure of the steering system, performing targeted braking interventions in order to maintain the lateral guidance for the lane-keeping support of the vehicle using a braking system of the vehicle; and
performing such braking interventions such that the vehicle is guided along a newly determined lateral guidance fallback trajectory which is determined for a failure situation of the steering system.

12. A method for lane-keeping support of automobiles during operation of a fully automatic driver assistance system configured for driver-independent vehicle guidance, the method comprising:
controlling actuatorics of a steering system of a vehicle during operation of the driver assistance system such that the vehicle is maintained within a driving lane,
checking, on a continuous basis, whether a failure of the steering system is present,
in the event of such failure of the steering system, performing targeted braking interventions in order to maintain the lateral guidance for the lane-keeping support of the vehicle using a braking system of the vehicle, and wherein, at the end one of a predetermined first time interval and after a predetermined first distance, such braking interventions are performed such that, in addition to the lateral guidance, the vehicle is braked to a standstill within a predetermined second time interval or a predetermined second distance.

\* \* \* \* \*